METHOD OF IMAGING A PHOTOLITHOGRAPHIC PLATE AND ELEMENTS FOR USE IN THE PREPARATION OF SAME

Filed March 31, 1955

INVENTORS
DONALD E. HANSON, SEAMON A. LINCOLN, FRANCIS A. REGAN, JR.
BY
Ooms, McDougall, Williams & Hersh Attorneys

United States Patent Office 3,278,958

Patented Oct. 18, 1966

3,278,958

METHOD OF IMAGING A PHOTOLITHOGRAPHIC PLATE AND ELEMENTS FOR USE IN THE PREPARATION OF SAME

Francis A. Regan, Jr., Palatine, Seamon A. Lincoln, Wheaton, and Donald E. Hanson, Park Ridge, Ill., assignors to A. B. Dick Company, Niles, Ill., a corporation of Illinois Filed Mar. 31, 1955, Ser. No. 498,192
8 Claims. (Cl. 10—149.2)

This invention relates to the production of multiple copies by a lithographic duplicating process and it relates more particularly to the manufacture of a new and improved lithographic plate and to a new and improved process for producing the ink receptive, water repellent image on the lithographic surface of the plate.

Various methods are employed in the lithographic art for the formation of the ink receptive, water repellent image on a water receptive, ink repellent surface of a lithographic duplicating plate. To the present, these processes may be divided into two principal groups generally referred to as the direct image process and the indirect or photolithographic processes. In the direct process, an ink receptive, water repellent imaging material is applied directly onto the lithographic surface of the lithographic plate. For such purposes, the lithographic plate may be imaged by the use of a writing instrument for applying the oleophilic, water repellent imaging material onto the surface of the plate. Instead, the image may be formed on the plate by means of a typewriter or by a die, using a ribbon or a transfer sheet coated with an ink receptive, water repellent imaging material which is transferred by the impressions from the transfer sheet to the lithographic surface to form the image thereon.

The indirect or photolithographic process is used for the reproduction of copies from an original. In general, a photographic negative is first produced of the original and then the negative is exposed in combination with a lithographic plate in which the lithographic surface has been presensitized with a material such as a resin-forming diazo compound or with a bichromate capable of tanning the colloid in combination therewith in the exposed areas whereby the exposed areas are converted to an ink receptive, water repellent surface upon exposure to light to form the image thereon. The light sensitive materials remaining in the unexposed portions of the plate, or the non-imaged portions must be removed, as by washing, before use can be made of the plate to produce copies.

The concepts described and claimed herein have application chiefly to the indirect process for the production of an imaged lithographic plate and the invention will hereinafter be described with reference to the manufacture and use of such a photolithographic plate. It will be apparent from the description that a lithographic plate embodying features of this invention may, however, be employed as a direct image plate when the imaging material applied to the lithographic surface of the plate contains substances capable of reaction with components on the surface of the plate to produce an ink receptive, water repellent image.

Photolithographic plates of the type heretofore produced have been constructed chiefly with a surface sensitized with a light-sensitive material, such for example as a resin-forming diazo compound which is converted to an ink receptive, water repellent resinous material upon exposure to light. Such photolithographic plates formed with light sensitive diazo compounds are subject to dark or thermal decomposition reactions which results in overall ink receptivity or scumming. As a result they have limited shelf life and it is necessary to prescribe an expiration period of relatively short time in which the plate must be used.

Aside from the limited shelf life inherent in plates of the type heretofore produced, the labor and equipment required for the preparation of a photolithographic plate to produce the image thereon from an original are excessive and relatively expensive.

The more recently developed xerographic process for producing an imaged lithographic plate from an original embodies fewer limitations than the diazo-sensitized photolithographic plates, especially from the standpoint of plate life and the character of the original, but the initial investment in equipment required is excessive and the methods for preparing the masters are tedious and involved.

It is an object of this invention to produce a new and improved lithographic plate and method for imaging same which is not subject to any of the deficiencies and disadvantages of the processes and products heretofore employed.

More specifically, it is an object of this invention to produce a new and improved lithographic plate and process for imaging same and it is a related object to produce a lithographic plate of the type described which can be fabricated in a simple and efficient manner; which is produced of low cost and readily available materials, which is not light-sensitive and therefore is not limited in time of use after preparation; in which the process enjoys the desired degree of exposure latitude; in which the process has a broad range of spectral sensitivity; which does not require an initial investment of expensive equipment for use in imaging the plate; which can be imaged in a simple and efficient manner from the original without an additional expenditure of time and labor; which has application chiefly as a positive working photolithographic plate; which may be used as a direct image plate, and which can be used to produce a large number of copies of good quality.

It is a further object of this invention to produce a lithographic plate and to provide a one-step photographic process for imaging same, and it is a related object to produce an imaged lithographic plate by a photo-reflex process.

These and other objects and advantages of this invention will hereinafter appear and for purposes of illustration, but not of limitation, an embodiment of the invention is shown in the accompanying drawing in which—

Figures 1, 2, 3, 4:
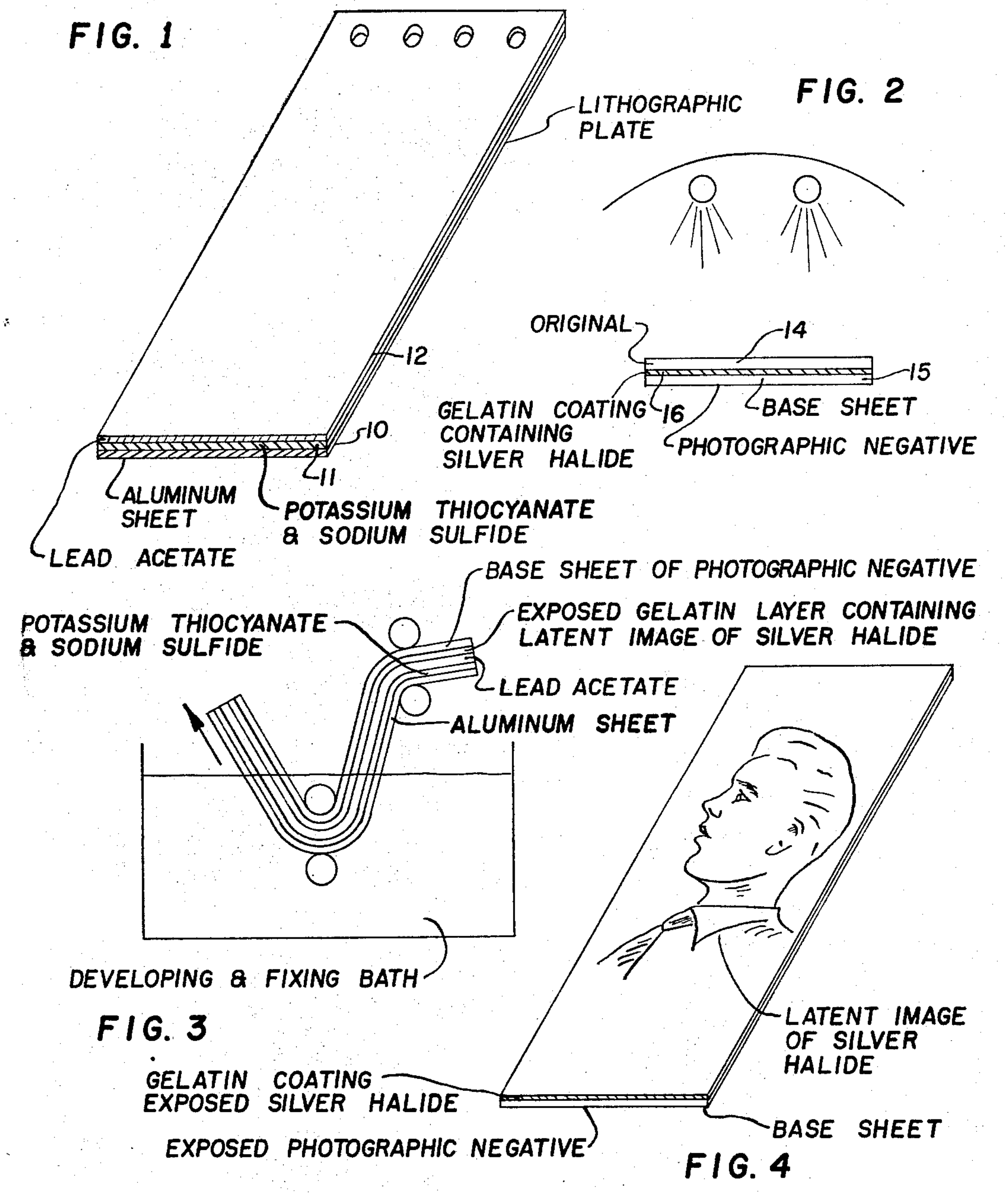
FIGURE 1 is a perspective view, partially in section, of a photolithographic plate embodying features of this invention.
FIGURE 2 is a schematic elevational view illustrating the arrangement of parts in an initial step of the process.
FIGURE 3 is a perspective view, partially in section, of the element prepared by the step of FIGURE 2.
FIGURE 4 is a schematic sectional elevational view illustrating a final step in the manufacture of the imaged lithographic plate.

In the Rott Patent No. 2,352,014, description is made of a single copy process wherein a photographic image of an original produced in a silver halide layer is caused to produce a reverse image on a copy sheet, provided the silver halide layer, after being exposed to light for the production of a master image and then being impregnated with a developer to develop the image, is pressed or squeezed in the presence of a fogging agent and a silver halide solvent onto the copy sheet while the layer is still imbibed with the developing liquid. That part of the silver halide in the layer which was not reduced during development after exposure to light and which in the ordinary photographic process would be fixed out of the fixing bath, will adhere to and enter the copy sheet surface by diffusion and will thus produce thereon a reversed image. In order to render this image freely visible, the light sensitive layer containing the master image will normally be removed from the copy sheet.

In the Rott process, use may be made of the silver halide solvents contained in the usual photographic developers, such as sodium sulfite, sodium thiosulfate and the like. As fogging agents, use is made of substances capable of promoting the reduction of silver halides without requiring the action of light, such for example as colloidal silver, colloidal forms of sulphur, silver sulfides, hypophosphites, stannous chloride, and organic compounds which are capable of splitting off silver in the form of bivalent ions, such as thiosinamine. Such fogging agents are preferably embodied in the copy sheet during manufacture thereof or by subsequent impregnation.

It has now been found that when use is made of an alkali metal thiocyanate, such as sodium, potassium or ammonium thiocyanate, as an intermediate for tying up the silver halide for reduction, somewhat similar to the fogging agents of Rott, instead of producing a reversed image as a single copy on a receptive material or copy sheet, a reversed image of an oleophilic or water repellent image is formed which, when produced on a hydrophilic, water receptive lithographic surface, can be used to produce a large number of inked copies by conventional lithographic printing methods.

While the reversed image of the oleophilic, water repellent or ink receptive imaging material is formed by diffusion on the lithographic surface as a reaction product when the alkali metal thiocyanate is present as an ingredient dissolved in the development solution, it is preferred to supply the alkali metal thiocyanate as a substantially continuous coating on the lithographic surface of the lithographic plate which is brought into contact with the photographic image produced in the silver halide layer.

It is preferred to make use of a plate having a non-porous, non-absorbent surface because the amount of complexed silver halide available for transfer from the photographic image on the exposed negative or the like is usually insufficient to develop the desired image intensity on the surface of the lithographic plate when portions thereof are capable of being diffused inwardly into the interior of the plate. Thus it is desirable to make use of a plate formed of metal such as zinc or aluminum in the form of a rigid plate, sheet stock or foil which has been treated on the printing surface for rendering the surface hydrophilic, as by brushing, silicating, anodizing, etching and the like. Instead, use can be made of a paper lithographic plate formed wth a hydrophilic colloid coating such as described in plates formed in accordance with the teaching of the United States patents of Fros, No. 2,534,588; Worthen, No. 2,534,650; Van Dusen, No. 2,542,784, and Shepherd, No. 2,154,219, or parchment plates or plates formed of lithographic stone or the like.

In preparation of the coated plate, the alkali metal thiocyanate can be applied from solution by conventional coating means, such as by spray coating, flow coating, brush coating, roller coating, dip coating and the like. It will be sufficient if a monomolecular layer is formed of the alkali metal thiocyanate but it is preferred to provide an amount greater than a monomolecular layer for development of maximum image intensity. The upper limit of concentration, which depends greatly on the structure of the film negative and the method of use, can best be established from a few simple trials to determine the concentration at which the image begins to walk off at the surface.

It has been found that the ink receptivity of the reversed image formed on the lithographic surface is markedly improved to produce inked copies of better quality when a soluble sulfide, such as sodium sulfide, potassium sulfide or ammonium sulfide is present on the surface of the lithographic plate. The sulfide may be applied to form a coating on the lithographic surface separate and apart from the alkali metal thiocyanate but it is preferred, when the thiocyanate is present as a coating on the lithographic plate, to combine the sulfide with the thiocyanate for application together to form the desired coating on the hydrophilic lithographic surface.

For the development of the improved characteristics by the sulfide, it is desirable to make use of the sulfide in amounts ranging from 1 part by weight thereof to 1–5 parts by weight of the thiocyanate or similar agent reactive to form the insoluble, oleophilic reaction product. When the ratio of sulfide to thiocyanate or other suitable fogging agent is greater than 1 to 1, the printing plate may be less satisfactory from the standpoint of ink receptivity in the imaged areas. When the ratio of sulfide to thiocyanate is less than 1 to 5, the printing plate becomes less satisfactory from the standpoint of scumming and reduced visibility of the image formed on the plate believed to form by reaction of the sulfide with silver to form a dark silver sulfide reaction product in the imaged areas of the plate.

In the practice of this invention, it is preferred to make use of the sulfide in the ratio of about 1 part by weight sulfide to 3 parts by weight thiocyanate or the like. Instead of sodium sulfide, use can be made of other soluble sulfides such as potassium sulfide and ammonium sulfide, as previously described, or water soluble compounds capable of releasing sulfide ions for reaction upon solution in the transfer medium.

By way of still further improvement, it has been found that the ink receptivity of the reversed image and the anchorage of the oleophilic water-insoluble image produced on the plate surface is increased by the presence of lead ions on the lithographic surface, preferably in the form of a soluble lead salt, such as lead acetate, or other soluble bivalent metal salts such as lead chloride, lead propionate, lead nitrate and similar salts of zinc, nickel, copper, cobalt and the like. Since the lead salts form insoluble compounds with the sulfides, it is preferred, when used, to apply the lead as a coating onto the lithographic plate separate and apart from the sulfide and thiocyanate. The concentration of metal salts is not critical as long as sufficient lead ions are present in the coating to cause development of the desired oleophilic material upon diffusion of the complexed silver halide from the photographic image.

The following is a description of the preferred practice of this invention:

EXAMPLE I

*Manufacture of the lithographic plate*

For use in the practice of this invention, an aluminum sheet 10, the surface of which has been treated by brushing, silicating, anodizing, etching or the like to render the surface lithographic, is coated with a solution containing 15 parts by weight potassium thiocyanate and 30 parts by weight sodium sulfide in 80 parts by weight of water. Application of the coating is made by any conventional process, such as by spray coating, roller coating, brush coating and the like but it is preferred to coat the treated aluminum surfaces by means of a pair of squeegee rolls mounted to engage the opposite sides of continuous strips of aluminum advanced in face to face relation from a pair of feed rolls.

The coating composition is applied in quantities sufficient to completely coat the surface of the aluminum to provide at least a monomolecular layer 11. The amount applied to the surface of the plate is such that the coating air dries within a very short time, such for example as in about 10–30 seconds, without the necessity for using elevated temperatures.

Following the first coating, the aluminum surface is subsequently coated with a 10 percent solution of lead acetate in water. Application is made in substantially the same manner as the first coating to provide a thin layer 12 following which the sheet is dried, as by air drying, in a relatively short time such as from 10–30 seconds.

An aluminum sheet treated in the manner described is not sensitive to light and thus may be manufactured in mass production processes in unlimited amounts and may be sheeted and packaged for subsequent use in the manufacture of imaged photolithographic plates without limitation as to the conditions of storage or the length of time intervening between manufacture and use.

EXAMPLE II

*Preparation of the imaged master*

Description will now be made of the use of the lithographic plate of Example I in the preparation of an imaged master by print-through contact exposure from an original 14. First a photo-negative 15 containing a light sensitive silver halide in a gelatin emulsion or the like hydrophilic colloid coating 16 on a suitable base sheet such as paper or plastic film stock is exposed to an original by reflex or by print-through contact or by projection printing to form a latent image in the silver halide gelatin emulsion. It is preferred in this process to make use of a photographic negative which is transparent or translucent in order to give maximum latitude of the original. The photographic negative does not have to be flexible and the thickness and dimension of the negative do not constitute important factors in the process. By way of example, a suitable photographic negative is marketed by Agfa under the trade name "Copyrapid."

The exposed photographic negative is developed in a solution containing the normal developing components plus a material which is a solvent for the silver halide such as in a typical monobath developer including a developer and fixer such as are ordinarily employed in photographic practice, a typical composition of which may be formulated of 30 grams hydroquinone, 30 grams sodium hydroxide, 40 grams sodium sulfite, 10 grams sodium thiosulfate, 1.5 grams benzotriazole, with water sufficient to make up one liter. This development is carried out under such conditions that the photographic negative wet with the solution and the photolithographic surface wet with the solution are brought into surface contact with each other, as illustrated in FIGURE 4, so that the soluble silver complex that is formed of the silver halide in the photographic image is caused to diffuse to the corresponding areas of the lithographic surface. Usually, contact under the conditions described for from ½–2 minutes is sufficient to effect the desired transfer for the development of the reversed, oleophilic, water-insoluble image on the lithographic plate.

The lithographic surface containing the alkali metal thiocyanate alone or in combination with sodium sulfide and/or lead acetate promotes the reduction of the silver halide complex without the action of light to produce an oleophilic, water-insoluble reaction product which is transferred or forms on the surface of the lithographic plate. The oleophilic reaction product formed in the areas corresponding to the original becomes strongly anchored to the lithographic surface to form the image which can now be used to produce a large number of copies by lithographic duplicating techniques. The printing plate may be lacquered by known techniques or printed without lacquer, as preferred, on an offset lithographic press to produce exact and clear copies of the original.

Instead of making use of an alkali metal thiocyanate, a water-insoluble, oleophilic reversed image having some degree of ink receptivity may be secured by the use of a system based on the use of argyrol, a silver protein and lead salts but the ink receptivity and the intensity of the copy that is producted is not as good as that secured with a system based upon the use of an alkali metal thiocyanate alone or in combination with a soluble sulfide or combinations thereof with soluble lead salts. A water-insoluble, oleophilic reversed image can also be secured when the lithographic surface is coated with dithioxamide and a lead salt, with or without a soluble sulfide such as lead sulfide. Lead and iron salts in combination with a soluble sulfide applied independently to form separate layers show some degree of ink receptivity. These other systems may be used in the production of a lithographic plate in accordance with the procedures of Examples I and II by substitution of the solutions of the above materials for the thiocyanate and sulfide and for the lead acetate. In the presence of lead acetate or other soluble bivalent metal salts of the type described, with or without a soluble sulfide, almost any of the fogging agents of the type described in the Rott patent which will precipitate soluble silver may be used to produce an ink receptive, water repellent, reversed image on a lithographic surface for use in the production of multiple copies.

The following are further examples of compositions which may be used in the practice of this invention in lieu of the first coating composition of Example I:

EXAMPLE III

| | Parts by weight |
|---|---|
| Sodium thiocyanate | 10 |
| Water | 90 |

EXAMPLE IV

| | |
|---|---|
| Dithioxamide | 10 |
| Ammonium sulfide | 5 |
| Water | 85 |

EXAMPLE V

| | |
|---|---|
| Lead acetate | 10 |
| Thiosinamine | 10 |
| Water | 80 |

EXAMPLE VI

| | |
|---|---|
| Argyrol-silver caseinate | 15 |
| Water | 85 |

The following compositions may be employed in lieu of the lead acetate solution applied as a second coating on the surface of the lithographic plate:

EXAMPLE VII

| | Percent by weight |
|---|---|
| Barium chloride in water | 5–15 |

EXAMPLE VIII

| | |
|---|---|
| Copper acetate in water | 5–20 |

EXAMPLE IX

| | |
|---|---|
| Zinc chloride in water | 5–20 |

Where the sulfide or its equivalent is omitted from the first coating, the polyvalent metal salt may be formulated into a single coating composition with the cyanate for application onto the lithographic surface as illustrated by the composition of the following example:

EXAMPLE X

| | Percent by weight |
|---|---|
| Ammonium thiocyanate | 3–20 |
| Zinc chloride | 5–15 |
| Remainder water. | |

A plate formed of compositions of Examples III, IV, V and VI, for example, may be employed without the top coating with compositions of Examples VII, VIII and IX, but plates formed of compositions of Examples III and IV are improved by the applications of compositions of Examples VII, VIII and IX to form top coatings.

Instead of making use of a photo-negative, it has been found that the gelatin coating sensitized with the silver halide may be applied as a coating directly onto the surface of a lithographic plate which has previously been coated with the desired materials for reaction to produce a desirable silver compound with the silver halide. After exposure, the silver halide in the unexposed areas corresponding to the image in the original is caused to diffuse to the coated surface of the lithographic plate during immersion in the developer for the exposed silver halide in which a suitable solvent for the unexposed silver halide complex is present to enable diffusion.

Transfer of the silver halide in the processes described has been found to cause adhesion of the lead salts and the formed reaction product with the silver salts to the aluminum or other base of the lithographic plate. Upon formation of the water-insoluble, oleophilic image as a reaction product, the gelatin is removed from the surface with warm water.

By way of further modification, film forming agents such as water-soluble, hydrophilic colloids including gelatin, casein, polyvinyl alcohol, the alginates and the like, may be formulated in small amounts in the initial coating composition for use as a film-former adhesive to anchor the materials to the lithographic surface.

As previously indicated, the lithographic plate formed in accordance with the practice of this invention can, if desired, be used as a direct image plate wherein the imaging material applied to the surface of the plate as a writing fluid or as a composition transferred by impact of a typewriter or die, contains a silver halide in solution capable of reaction with the thiocyanate or other reactive materials described on the plate surface to form the described water-insoluble, oleophilic, reaction product.

In sheeting, the plate may be formed to size with suitable openings in the leading edges for attachment to the hooks provided on the plate cylinder of a lithographic press, and the plates may also be formed with serrated trailing edges for engagement by the clamping means on the plate cylinder.

It will be understood that the concepts of this invention are not dependent on the concentrations of the various materials in the coating compositions so long as a uniform coating can be applied to the surface of the plate for deposition of a thin layer of the essential ingredients thereon. It would be undesirable to make use of coating compositions having high concentrations of the salts or other materials such as in excess of 30 percent by weight, since such large amounts are unnecessary and such coating compositions might render the product and process uneconomical.

It will be understood that changes may be made in the details of construction of the plate, formulation of the coating compositions, and the method of application, and that changes may be made in the manner of use of the plate without departing from the spirit of the invention, especially as defined in the following claims.

We claim:

1. A multiple copy process comprising the steps of applying an aqueous alkaline solution of a silver halide developer and a silver halide solvent to a photo-exposed silver halide stratum and a superposed hydrophilic, water receptive, silver receptive stratum which contains nuclei for precipitation of silver from a water soluble silver complex and in which the hydrophilic, silver receptive stratum is overcoated with separate coats one of which comprises a water soluble sulfide selected from the group consisting of ammonium sulfide and an alkali metal sulfide and the other of which comprises a water soluble salt of a bivalent metal selected from the group consisting of lead, zinc, nickel, copper and cobalt, reducing the exposed silver halide in the silver halide stratum to silver, forming from unreduced silver in the silver halide stratum a water soluble silver complex, diffusing the complex to the silver receptive stratum, producing from the complex in conjunction with the nuclei a visible image on the silver receptive stratum, said image having first areas which contain silver concentrated primarily at the surface as an oleophilic ink receptive material and second non-imaged areas which are substantially silver free, stripping the silver halide stratum from the silver receptive stratum, wetting the silver receptive stratum with an aqueous medium to wet out the second areas, coating said silver receptive stratum with an ink which will preferentially wet out said first areas, and pressing the inked surface onto a copy member for the transfer of the ink image thereto.

2. The process as claimed in claim 1 in which the water soluble sulfide is sodium sulfide.

3. The process as claimed in claim 1 in which the soluble sulfide constitutes a first coat on the silver receptive stratum and the water soluble salt of a bivalent metal constitutes a second coat on the silver receptive stratum.

4. The process as claimed in claim 1 in which the water soluble salt of a bivalent metal constitutes a first coat on the silver receptive stratum and in which the soluble sulfide constitutes a second coat on the silver receptive stratum.

5. A lithographic duplicating master comprising a base sheet having a silver receptive stratum containing nuclei for precipitation of silver from a water soluble silver complex and in which the surface of the silver receptive stratum is hydrophilic, water receptive, water insoluble and ink repellent, separate coatings on the surface of the silver receptive stratum in which one of the coatings comprises a water soluble sulfide selected from the group consisting of ammonium sulfide and an alkali metal sulfide and the other coating comprises a water soluble salt of a bivalent metal, and means for mounting the master onto a lithographic printing press.

6. A lithographic duplicating master as claimed in claim 5 in which the soluble sulfide is sodium sulfide.

7. A lithographic duplicating master as claimed in claim 5 in which the soluble sulfide is a first coat on the silver receptive stratum and in which the salt of a bivalent metal constitutes a second coat.

8. A lithographic duplicating master as claimed in claim 5 in which the salt of a bivalent metal constitutes a first coat on the silver receptive stratum and in which the soluble sulfide constitutes a second coat on the silver receptive stratum.

References Cited by the Examiner

UNITED STATES PATENTS

| | | | |
|---|---|---|---|
| 1,618,505 | 2/1927 | Beebe et al. | |
| 2,352,014 | 6/1944 | Rott | 95—88 X |
| 2,494,053 | 1/1950 | Mitson et al. | 95—5.4 |
| 2,596,756 | 5/1952 | Yutzy et al. | 96—45 X |
| 2,635,048 | 4/1953 | Land | 95—88 X |
| 2,676,886 | 4/1954 | Barbarite | 95—5.4 |
| 2,698,245 | 12/1954 | Land | 96—29 |
| 2,725,298 | 11/1955 | Yutzy et al. | 95—88 |
| 2,740,717 | 4/1956 | Yutzy et al. | 96—29 |
| 2,763,553 | 9/1956 | Clark et al. | 96—33 X |
| 2,774,667 | 12/1956 | Land et al. | 96—29 |
| 3,186,842 | 6/1965 | De Haes et al. | 96—29 |

NORMAN G. TORCHIN, *Primary Examiner.*

PHILIP E. MANGAN, MILTON STERMAN, J. TRAVIS BROWN, *Examiners.*

M. GROSS, J. L. SPROULL, B. E. EDELSTEIN, D. LEVY, *Assistant Examiners.*